United States Patent [19]

Goldman et al.

[11] Patent Number: 4,726,014

[45] Date of Patent: Feb. 16, 1988

[54] CELLULAR MOBILE RADIO SERVICE TELEPHONE SYSTEM

[75] Inventors: Stuart O. Goldman, Columbus; Erik A. Lissakers, Perrysville; Matthew W. S. Thomson, Worthington, all of Ohio

[73] Assignee: U.S. Holding Company, Inc., New York, N.Y.

[21] Appl. No.: 780,493

[22] Filed: Sep. 26, 1985

Related U.S. Application Data

[62] Division of Ser. No. 457,155, Jan. 11, 1983, Pat. No. 4,562,572.

[51] Int. Cl.$^4$ ...................... H04Q 11/04; H04Q 7/00; H04M 11/00
[52] U.S. Cl. ................................. 370/58; 340/825.79; 455/33; 455/56; 379/60
[58] Field of Search .................. 370/80, 110.2, 63, 58, 370/95; 340/825.79, 425.8; 455/33, 56, 54; 179/2 EB; 379/59, 60

[56] References Cited

U.S. PATENT DOCUMENTS 3,663,762  5/1972  Joel, Jr. .................................. 455/33
3,836,726  9/1974  Wells et al. ........................... 455/33
4,480,330 10/1984  Magnusson et al. ............. 370/110.2
4,562,572 12/1985  Goldman et al. ..................... 370/80

OTHER PUBLICATIONS

Casas, F. A., "ITT 1240 Digital Exchange Network Planning and Application", Electrical Communication, vol. 56, No. 2/3, 1981, (1/1/82), pp. 302–314.

Calvert, F. J., "Aurora–Automatic Mobile Telephone System", 1981 International Conference on Communications, Denver, Colo., (6/81).

Primary Examiner—Douglas W. Olms
Assistant Examiner—Frank M. Scutch, III
Attorney, Agent, or Firm—Peter C. Van Der Sluys

[57] ABSTRACT

An improved cellular mobile radio telephone system is described wherein the switching matrices used to provide communication paths between subscribers is also used to provide paths for carrying control information between a network control and the various transceivers, receivers and transmitters at cell sites. Additionally, statistical multiplexers are provided at the cell sites for multiplexing control signals for many transceivers, receivers and transmitters onto the transmission facilities connecting the cell site with the network control system. At the network control system, apparatus is provided to reformat and packetize control signals from many statistical multiplexers and present the reformatted, packetized information to a network control processor.

5 Claims, 12 Drawing Figures

---- VOICE
------ DATA
NCS   NETWORK CONTROL SYSTEM
CSC   CELL SITE CONTROL SYSTEM

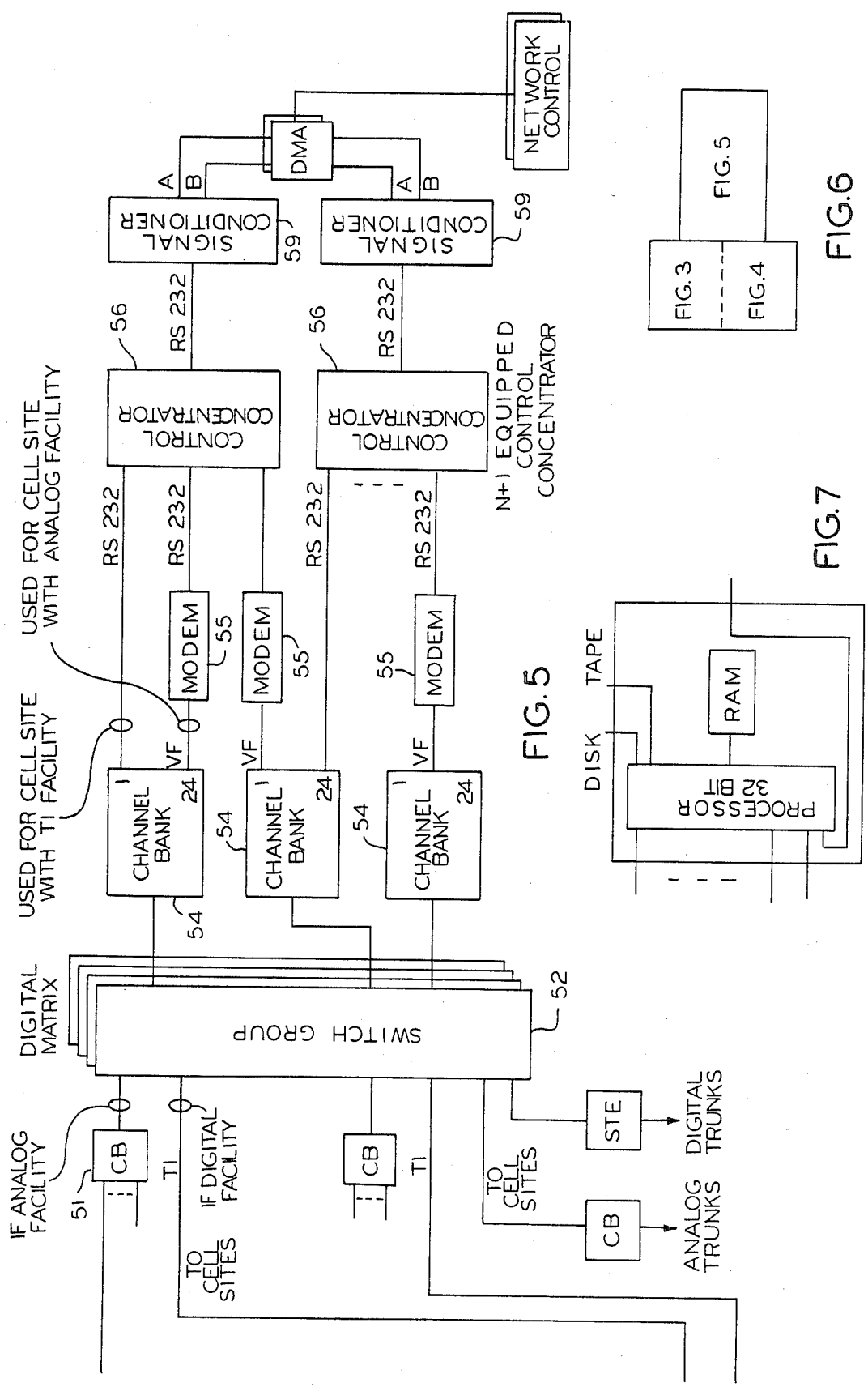

CELLULAR MOBILE RADIO SERVICE TELEPHONE SYSTEM

This is a division of application Ser. No. 457,155 filed on Jan. 11, 1983, now U.S. Pat. No. 4,562,572.

BACKGROUND OF THE INVENTION

This invention pertains to an improved type of mobile telephone system, in general, and to an improved cellular mobile radio telephone system, in particular.

Cellular Mobile Radio Service (CMRS) is a fully automatic radiotelephone service for use by mobile, portable, or stationary units specifically designed with sophisticated digital controls and logic. The radiotelephone units utilize radio frequency to communicate with low power, limited radiation base transceivers in a cellular pattern making it necessary for the system to locate each mobile unit and follow it enroute by "handing off" in-progress calls between cells. The low power, limited radiation elements of CMRS systems allow a unique frequency distribution and reuse scheme to provide sufficient channels to serve any number of subscribers (i.e. 100,000).

The mobile radios are intelligent units; that is, they contain a microprocessor equivalent logic element. They store certain permanent information (i.e. unit manufacturer's serial number), semi-permanent information (i.e. registration memory), temporary memory containing individual call data and timers, etc. In the United States, as a result of FCC regulations, each unit can access 666 radio channels but must manually or automatically select either an upper band of 333 of a lower band. (Current FCC rules allocate the upper band to a non-wire line RCC and the lower band to a telco owned RCC).

The base radio "stations" are located in a pattern of "cells" of from about 1 mile to up to 10 miles across which form a patchwork coverage of the desired area. Each cell radio operates with several assigned channels selected so that they do not interfere with channels of nearby cells. Due to the restricted power and range of cell radio transmitters, each set of cell frequencies may be reused in a cell only a few miles away.

One CMRS system called the "Advanced Mobile Phone Service" (AMPS) system is described in great detail in "The Bell System Technical Journal," January, 1979, Vol 58, No. 1, pages 1–269. In the AMPS system control of the various transceivers at a cell site is via dedicated wires to a central processor.

SUMMARY OF THE INVENTION

In accordance with the principles of the invention, a cellular mobile radio system is provided having "switched-through control." More specifically, the switching matrix used for switching of the signals representing the audio portion of telephone calls is also used to selectively switch the various control signals associated with processing of telephone calls.

Even more specifically in accordance with the invention, control signals between cell site transceivers and the network control system (NCS) are switched through the switching matrix and share the standard transmission facilities used for the audio aspect of telephone calls.

Further in accordance with the "switched-through control" aspect of the invention, multiple NCS's may be used to expand the size of the CMRS system by exchanging control information via paths established through the respective switching matrices and the standard transmission facilities interconnecting the NCS's.

Still further in accordance with the "switched-through control" aspect of the invention, a CMRS system may be provided with a remote switch group (RSG) arrangement having its own switching matrix and wherein the RSG arrangements operate under its own microprocessor control with sufficient intelligence to switch port-to-port traffic and perform routine tasks under NCS direction via the NCS switching matrix standard transmission facilities and the RSG switching matrix.

In accordance with the "switched-through control" aspect of the invention, a high degree of reliability may be provided by the use of individually redundant cells coupled to a NCS switching matrix which in turn couples to a common pool of control elements.

Further in accordance with the principles of the invention, the control signals for a plurality of transceivers are statistically multiplied together to form a concentrated byte interleaved data stream. A plurality of concentrated data streams are reformatted in packetized form into a more highly concentrated data stream which is presented to the NCS central processor complex.

BRIEF DESCRIPTION OF THE DRAWINGS

These and other aspects of the invention may be better understood from a reading of the following detailed description in conjunction with the drawings in which:

FIGS. 3, 4 and 5 which arranged as shown in FIG. 6 illustrate the control paths of FIG. 2;

FIG. 7 illustrates a control concentrator in greater detail;

DETAILED DESCRIPTION

Figure 1:
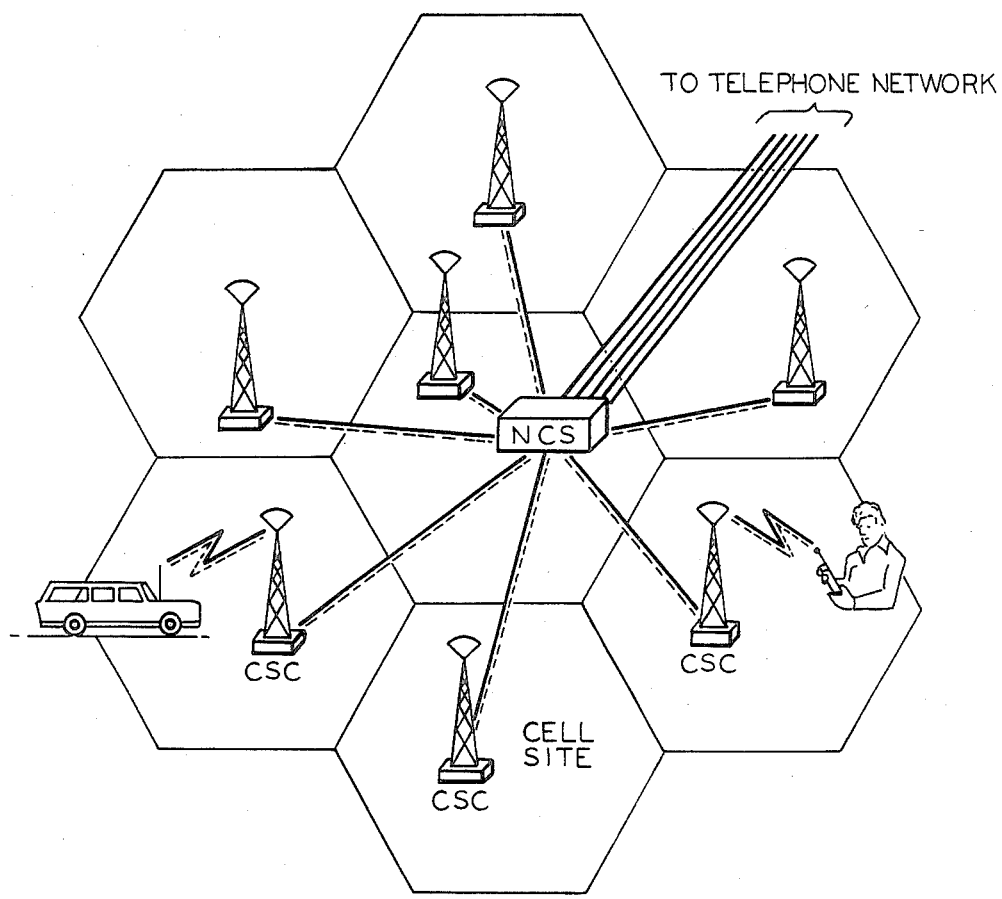
FIG. 1 illustrates a CMRS system.

The CMRS system of FIG. 1 illustrates an arrangement having 7 cells each having voice and data connections to a network control system (NCS). The NCS is in turn connected to the telephone network.

Each cell uses one or more of 21 channels as set-up channels to broadcast continuously certain routine or overhead information which permits the mobiles to select the nearest cell, identify the system, etc.

The CMRS system continuously transmits digital data on each cell set-up channel including such information as the CMRS system identification, overload control ("line load" control), synchronizing bits, busy-idle status of reverse signaling channel and signaling channel numbers used in this location.

If a call was made to a Home Mobile Unit (HMU) directory number, the system would try to page it by sending out the car directory number of paging (setup)

channels. Receiving no response, the NCS can return such an indication to the calling subscriber in the form of an announcement. (If the called mobile unit is turned on and answers the page, the mobile will be "rung" and the caller will receive ringback tone indicating that the mobile is in the area and turned on). When the mobile unit first turns on his radiotelephone, it first scans all set-up channels. The unit would verify that it was in its home area dn the paging (or set-up) channels and voice channels used in this complex would be identified to the mobile unit. The mobile unit would then scan the identified set-up channel and select and tune to the strongest one, presumably the nearest cell transmitter. "Busy-idle" bits inform the mobile unit the status of the reverse (mobile to base) signaling channel to prevent simultaneous seizure by more than one mobile unit. (There are also other handshake and timing checks to guard against "collisions".)

The mobile unit now automatically "reports in" to the system and sends its unit serial number, its assigned telephone number (7 to 10 digits), its power level, etc. and turns off its transmitter, continuing to monitor the selected set-up channel for a page.

The NCS "registers" the mobile unit as either a home or foreign unit. Depending upon system procedures, the registration could verify that service has not been discontinued or is not on a "hot list" relating to unauthorized use or stolen units.

On a call to mobile, the NCS directs the paging (7 digit number) to be sent on the appropriate paging channels. The mobile receives the page and detects that it coincices with its assigned telephone number. It acknowledges on a selected set-up channel by sending back its identification number. The NCS selects a voice channel and advises the mobile to switch to that channel, abandoning the set-up channel. The mobile acknowledges that he is now tuned to the selected voice channel by an in-band SAT (supervisory) tone. The NCS directs the base RF equipment to send an alterting data burst over the voice channel and the mobile begins the audible alert (ringing). The mobile returns an out of band signaling tone acknowledging that it is in a ringing process and the NCS returns ringback to the calling party. When the mobile is answered, the signaling tone is removed and the call cut through.

On a call from a mobile, a similar procedure occurs. Assuming that the mobile has "signed in" with his radio on, he will already be resitered in the NCS as a bona fide unit. To initiate a call, the mobile subscriber will enter the dialed digits of the called number and they are temporarily stored in the mobile unit.

Then the mobile goes "off hook" and scans and selects the strongest set-up channel. When the "busy-idle" bit signifies the channel is idle, the mobile sends identification and the dialed digits to the NCS. The mobile unit then waits for a voice channel assignment and, by supervisory and signaling tones associated with the assigned channel, provides the necessary answer supervision, disconnect, etc. The set-up channels are used only very briefly during the identification, location and voice channel assignment process. Since this is a big "party line" or common channel, occupancy must be limited. Once a two-way voice channel is established between the mobile and the cell site, all supervisory signals occur via in-band (SAT) or out of band (ST) tones.

Regardless of whether a call was originated by or completed to a mobile unit, a feature of CMRS is that so long as the mobile stays within the CMRS service area, voice communications will be maintained. As the mobile unit moves, the signal strength as received by various cell sites is transmitted to the NCS. The NCS decides when a "hand-off" to another cell is advisable based upon relative signal strength, next cell congestion, etc. The NCS enables the new cell and selects a new channel. A signal to switch to a new channel is sent to the mobile over the current serving channel by means of a very short digital burst which is not detectable by the listener. The mobile sends a disconnect signal tone, turns off its transmitter, re-tunes to the new channel and sends supervisory tone. The NCS recognizes the successful hand-off and switches circuits to the new cell site. The calling and called party are not aware of the hand-off since it occurs within milliseconds.

If the mobile is a "roamer" from another CMRS system (though perhaps serving the same area), it will be designated a Foreign Mobile Unit (FMU) in this area. Operation is almost identical except that local calls from the FMU are probably billable and must be recorded with calling details.

"Roamers" might be given a different priority of service, require validity checks from a distant data bank, etc. Also, since they do not have a local number, terminating calls present different problems. Since the FMU automatically registered his 10 digit number in the NCS, the paging and answer process is similar to that for a HMU.

Figure 2:
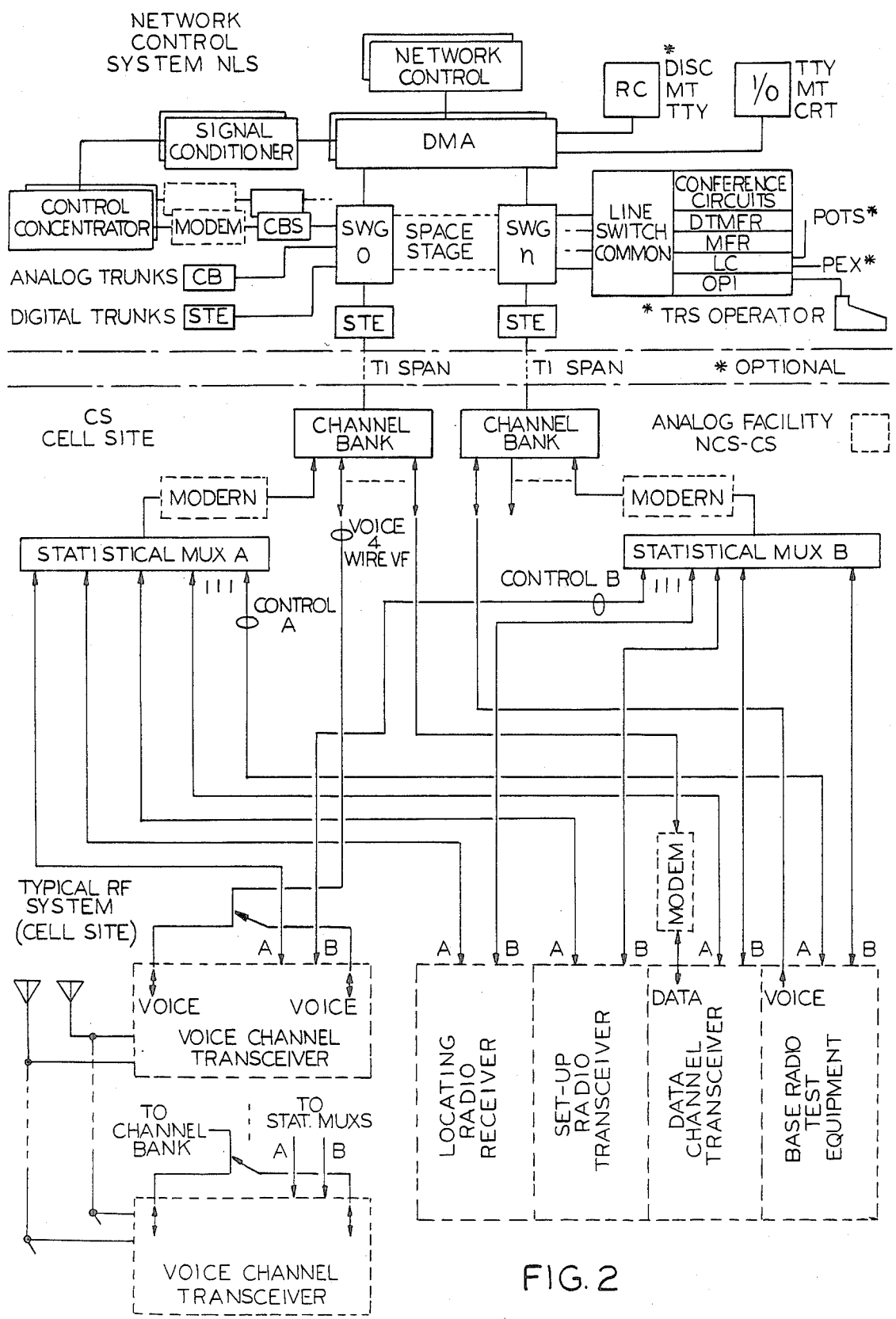
FIG. 2 illustrates in greater detail the NCS and one cell site of the CMRS system of FIG. 1.

The block diagram of FIG. 2 illustrates the NCS and one cell site of the system of FIG. 1 in greater detail. The NCS equipment includes the commercially available ITT System 1210 hardware and software. The basic configuration shown in FIG. 2 includes the ITT System 1210 processor as network control; direct memory access (DMA) equipment; switch groups; a line switch to accomodate service circuits such as DTMFR, MFR conference circuits, line interface (cc) and operator interface (OPI); various I/O peripherals such as TTY, magnetic tape (MT) and terminals (CRT); trunks; and a system test frame, tone and recorded announcement source, which are not shown in FIG. 1.

Additionally software for providing specific functions for cellular radio is provided. The NCS further includes a pool of control concentrators coupled between the switch group matrix and the DMA via channel units, modems if necessary, and signal conditioning circuits.

The NCS is coupled to the cell site via transmission facilities which in the example shown are T1 spans. The cell site includes a plurality of specialized use transceivers including set-up radio transceiver, data channel transceivers, voice channel transceivers, locating radio receivers, paging transmitters, and base radio test equipment. It should be noted that each of the transceivers, receivers or transmitters may be of type as described in the aforementioned Bell System Technical Journal reference or may be of any other types including types having microprocessor control. Each transceiver, receiver, transmitter has bidirectional control ports for the exchange of control information with the NCS. Additionally, the voice channel transceivers and the base radio test equipment have a bidirectional audio signal port; the data channel transceiver has bidirectional data ports. The audio signal ports are coupled via a 4-wire voice frequency facility to channel units contained in a channel bank which is in turn coupled to the T1 span and thus to the switch matrix in the NCS. Each bidirectional control port is duplicated and is coupled to the statistical multiplexers A and B. The statistical multiplexers are in turn coupled to channel units in the channel banks which in turn are coupled to the T1 span and thus to the switch matrix in the NCS. It should be noted that redundancy is provided for reliability purposes.

The statistical multiplexers shown in FIG. 2 and also in the other figures to be described below may be of the commercially available types described by Harry J. Hindin in "controlling data communications: statistical multiplexer move in", Electronics, July 28, 1981, p. 141-148 and by J. H. Scharen-Guivel and A. A. Carlson in "A buyers guide to todays versatile statistical multiplexers", Data Communications, March, 1982, pp. 97-126.

Generally, a statistical multiplexer is utilized to multiplex a number of terminals to a data link. Conventional time division multiplexers of either the bit- or the character-interleaving type assign dedicated time slots to each terminal. With statistical multiplexing the available bandwidth of the trunk is allocated dynamically. When the output link capacity is exceeded, incoming data from the terminals is buffered and queued by the multiplexer's microprocessors and random access memory until it can be accommodated. The statistical multiplexer also performs demultiplexing operations for coupling information from the data link to the terminals by using the inverse of the process described above.

It appears from the literature that statistical multiplexers are used in pairs one on one each end of the data link acting in complementary fashion. However, as is evident from FIG. 2, the embodiments of the invention utilizes statistical multiplexers on only one end of a link. The reasons for so doing will become apparent from the description below of FIGS. 3 through 6.

Figure 3:
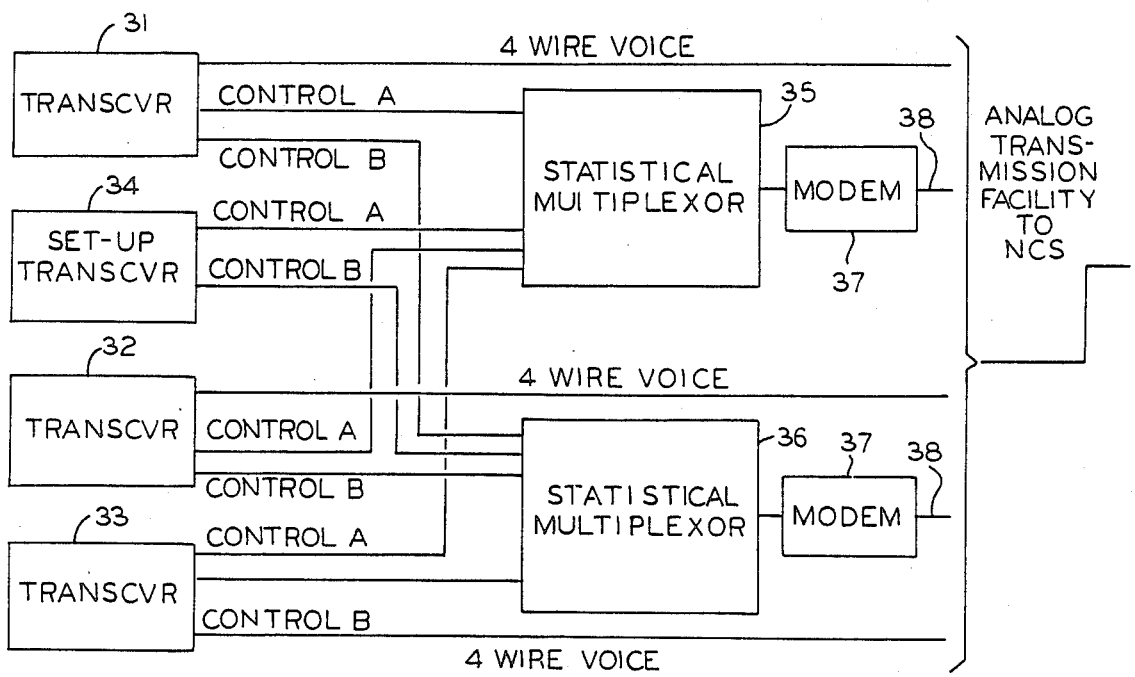
Figure 4:
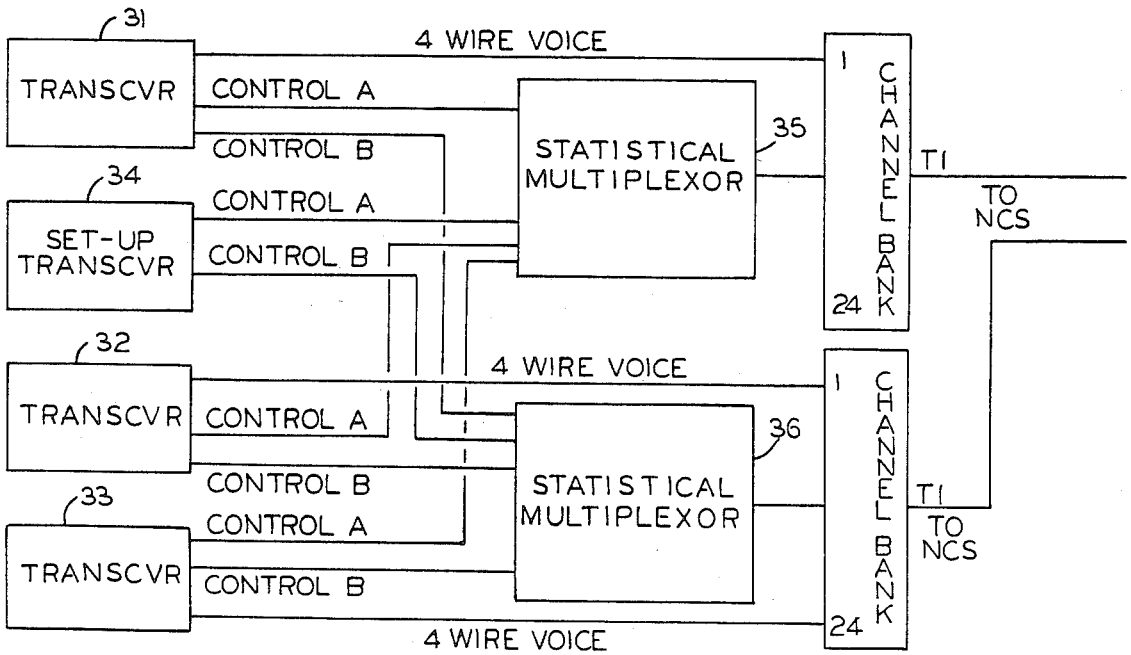

The control arrangement of FIG. 6 illustrates the NCS (FIG. 5) coupled via analog transmission facility (FIG. 3) to one cell and coupled via digital transmission facility (FIG. 4) to another cell. For simplicity, each of the cells is shown as having three voice channel transceivers 31, 32, 33 and one set up transceiver 34. Each voice channel transceiver has a pair of duplicated control ports control A, control B, respectively coupled to a pair of statistical multiplexers 35, 36. The data link side of each statistical multiplexer 35, 36 utilizes signals that are compatible to one or more of RS 232/422, 423 signaling classes.

Where analog transmission facilities as in FIG. 3 connects the cell site to the NCS, a standard commercially available modem 37 is used to convert the signals between the RS 232/422, 423 signaling classes to inband audio tones on an analog transmission facility 38 which is terminated at the NCS via a channel unit contained in channel bank 51.

Where digital transmission facilities as in FIG. 4 connect the cell site to the NCS, the data link side of the statistical multiplexer, 35, 36 are terminated on commercially available data type channel units in channel banks 41, 42 which are coupled to the digital transmission facility 43 which is terminated at the NCS.

It should be noted that one skilled in the art will recognize that various combinations of analog and digital transmission facilities may be used between the NCS and each cell site.

All control signal exchanges between the NCS and the statistical multiplexers 35, 36 whether transmitted over digital or analog facility are routed through the digital matrix of the NCS switch groups 52. For reliability, each cell includes the redundant pairs of statistical multiplexers 35, 36. Thus for N redundant pairs there are 2N appearances at the left side of the digital matrix as shown in FIG. 6.

For normal, non-maintenance, cell-site operation, it is sufficient for only one statistical multiplexer of each redundant pair to provide control signal exchanges with the NCS. Therefore, in normal, non-maintenance operation the NCS will establish a path through the digital matrix connecting only one statistical multiplexer of each redundant pair to a terminal at the right side of the digital matrix 52. A plurality of channel banks 54 are coupled to the terminals at the right side of the digital matrix 52. The channel banks include data channel units corresponding to the data channel units utilized in the channel banks of FIG. 4 and voice units connected to modems 55 as in FIG. 3. The data channel units and modems 55 are coupled to ports on a plurality of control concentrators 56 which are in turn coupled to the direct memory access DMA of the central processing unit CPU.

The communications from a plurality of transceivers is placed on the facility toward the control concentrators in a byte interleaved basis by the statistical multiplexers. Communications from a plurality of statistical multiplexers are byte deleaved and packetized by the control concentrator and serially presented to the DMA via signal conditioning circuits 59. Thus, the control concentrators 56 each serve to reformat and multiplex the communications from a plurality of statistical multiplexers thereby providing another level of multiplexing and concentration of control. Each control concentrator 56 shown in greater detail in FIG. 7 includes a microprocessor 71 having I/O ports, some of which are coupled to the statistical multiplexers via the matrix and one or a few of which are connected to the DMA. A random area memory 72 is coupled to the microprocessor 71 as are various peripherals such as a disk unit and a tape unit. The memory 72 is a 512K bytes of 32 byte memory.

Turning back to FIG. 6, although two control concentrators are shown, it should be understood that in illustrative embodiment it is contemplated that the number M of control concentrator required is $$\frac{N}{X}$$

where N=the number of redundant pairs of statistical multiplexers, and X=the number of statistical multiplexer ports available at one control concentrator. Where the fraction $$\frac{N}{X}$$

is not a whole number, M will be the next highest whole number. Additionally for reliability, spare control concentrators may be added to the pool of control concentrators.

Taking into account reliability considerations, the number of control concentrators required for a system having N pairs of statistical multiplexers is M+X where X is the number of spare units required to achieve the desired availability.

Figure 8:
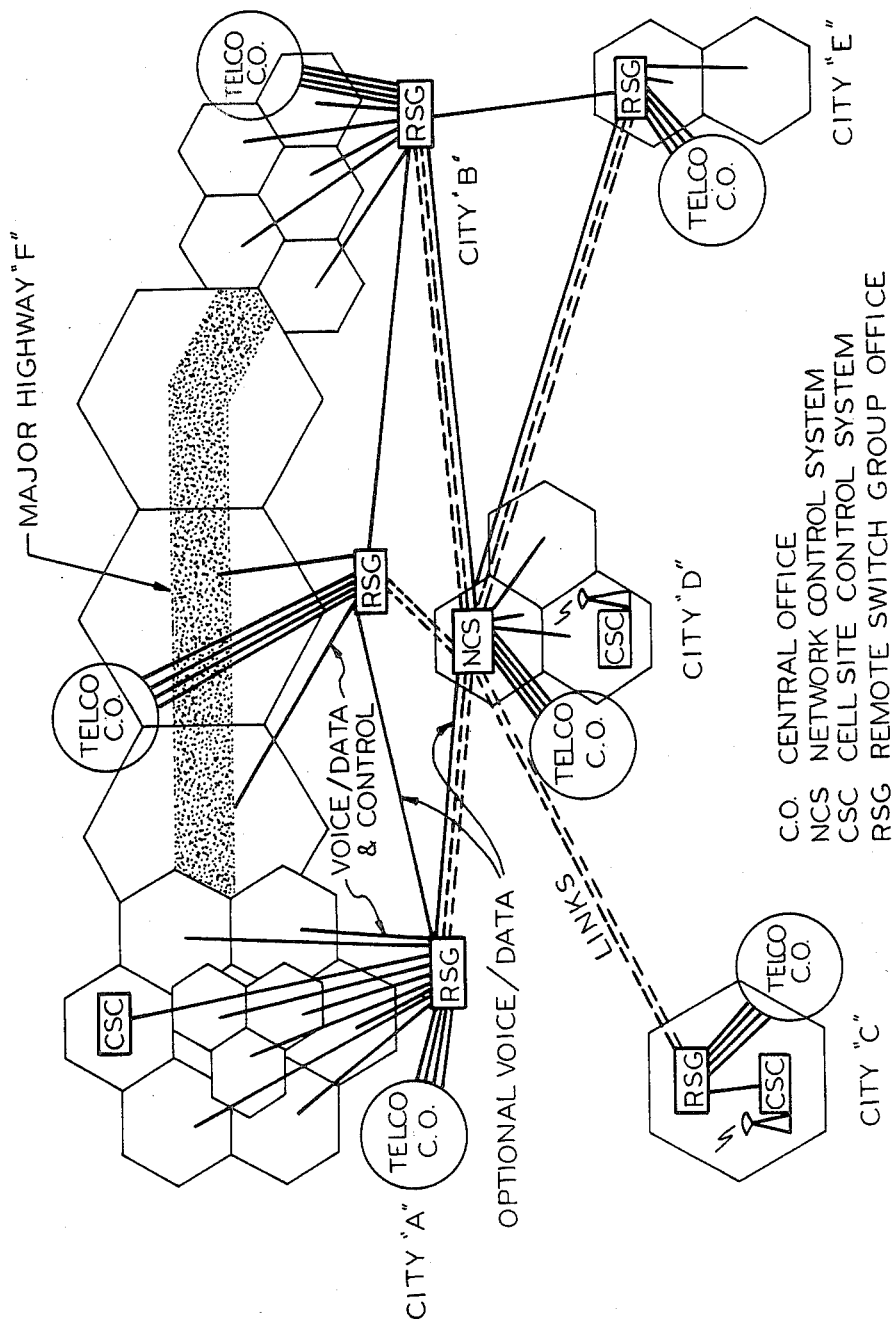
FIG. 8 illustrates a CMRS system utilizing remote switch groups.

FIG. 8 illustrates another advantageous configuration of a CMRS system wherein portions of the switching matrix are remoted from the NCS. This Remote Switch Group (RSG) arrangement operates under its own microprocessor control with sufficient intelligence to switch port-to-port traffic and perform routine tasks under hose NCS direction.

When RSG's are used, calls originating and terminating within a community of interest served by a RSG do not require back-haul voice circuit to the NCS. Control links (duplicated for reliability) from the NCS establish the RSG port-to-port connections, and the voice circuit is switched from the RSG directly into a local office or onto an outgoing trunk.

Figure 10:
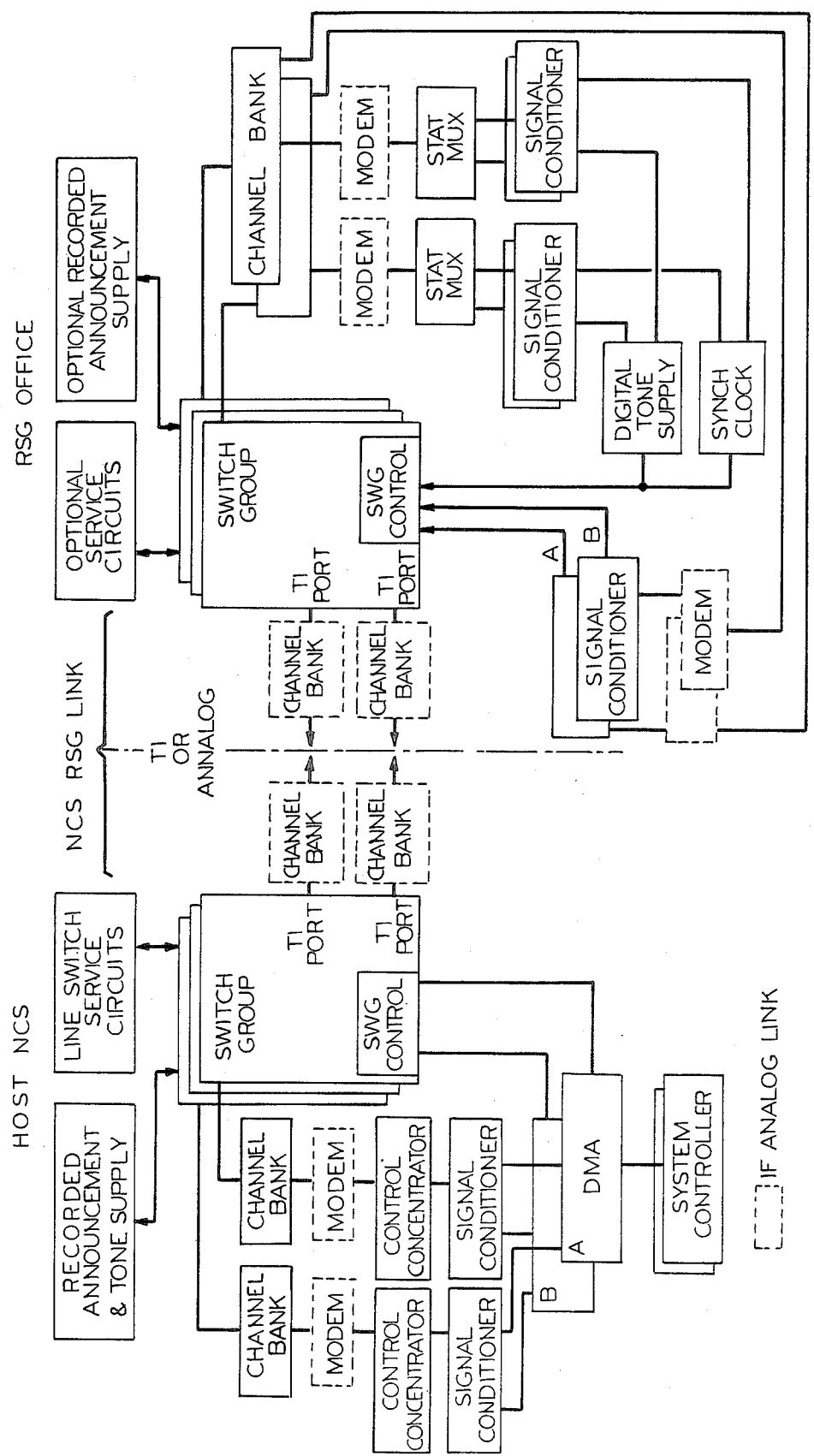
FIG. 10 illustrates a second arrangement for providing control of the remote switch groups by an NCS.

The RSG is a remote (from NCS) switching node within the cellular network, and consists in its most basic configuration of two or more standard ITT 1210 switch groups, a digital tone supply, a Stratum III synchronizable clock, and digital or analog trunks as required (see FIG. 10). Service circuits (MFR, conference circuits, etc.) and recorded announcement sources reside in the host NCS and are assigned dedicated channels in the NSC-to-RSG link route. Service circuits and announcement machines may be added in the RSG when its size and common traffic interest with the NCS make this desirable. The synchronizable clock is required to keep the digital RSG matrix synchronized with the NCS and digital links.

Two of the RSG switch groups are equipped with special interfaces to the digital tone supply (TAG) and synch clock for maintenance and alarm control access by the NCS system controller.

The NCS controller data structure is arranged to provide separate translation domains for each RSG. This allows individual routing patters for a given called number that are unique to that translation domain. Multiple translation domains per RSG (or NCS) can also be assigned.

All central processing of calls, maintenance, and administrative routines is performed by the NCS system controller as in the standard system configuration. The functions performed by the RSG switch group controllers and the RSG subtending CSC's are identical to those performed by the NCS switch groups and the NCS subtending CSC's. A minor exception is the previously mentioned remote maintenance and alarm control port operation.

Figure 9:
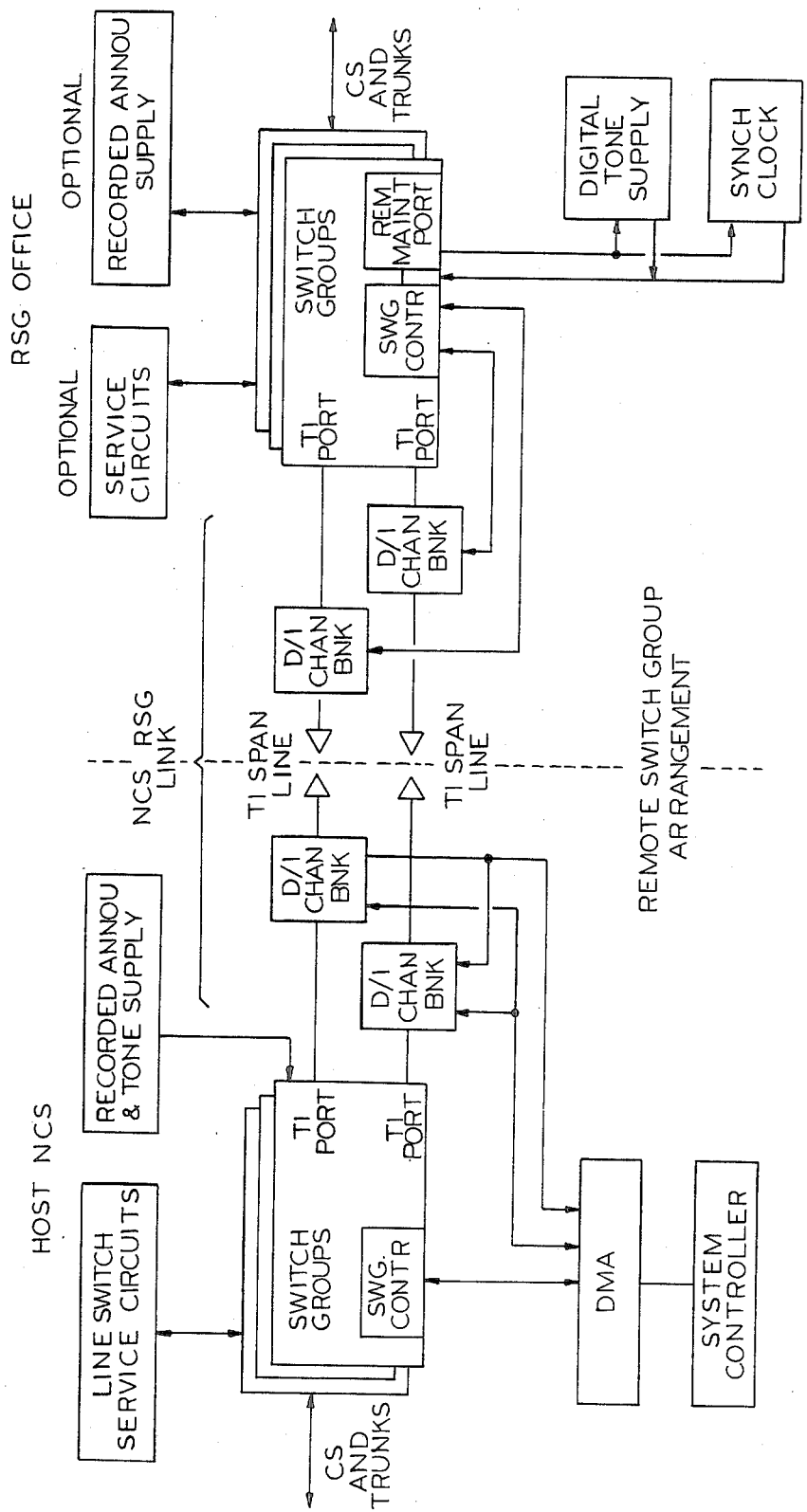
FIG. 9 illustrates one arrangement for providing control of the remote switch groups by a NCS.

As shown in FIG. 9, the links consist of standard T1 span lines (or T1 compatible facilities). Digital channel banks with individual channel Drop/Insert ports at each end are used for control communication between the NCS system controller and the RSG switch group controllers. Two channels per remote switch group controller (on separate T1 lines for reliability) are used, and the number of channels droped/inserted thus depends on the number of individual switch groups in the RSG.

The switched through control concept which was applied to the arrangements of FIGS. 1–7 can further advantageously be used for the arrangement of FIG. 8 as shown in FIG. 10. The control between the NCS and individual RSG's is accomplished by establishing a path from the DMA of the NCS through the NCS's matrix over transmission facility to the RSG through its matrix to the switch group (SWG) control of the RSG. Two channels per RSG controller are used for reliability.

Figure 11:
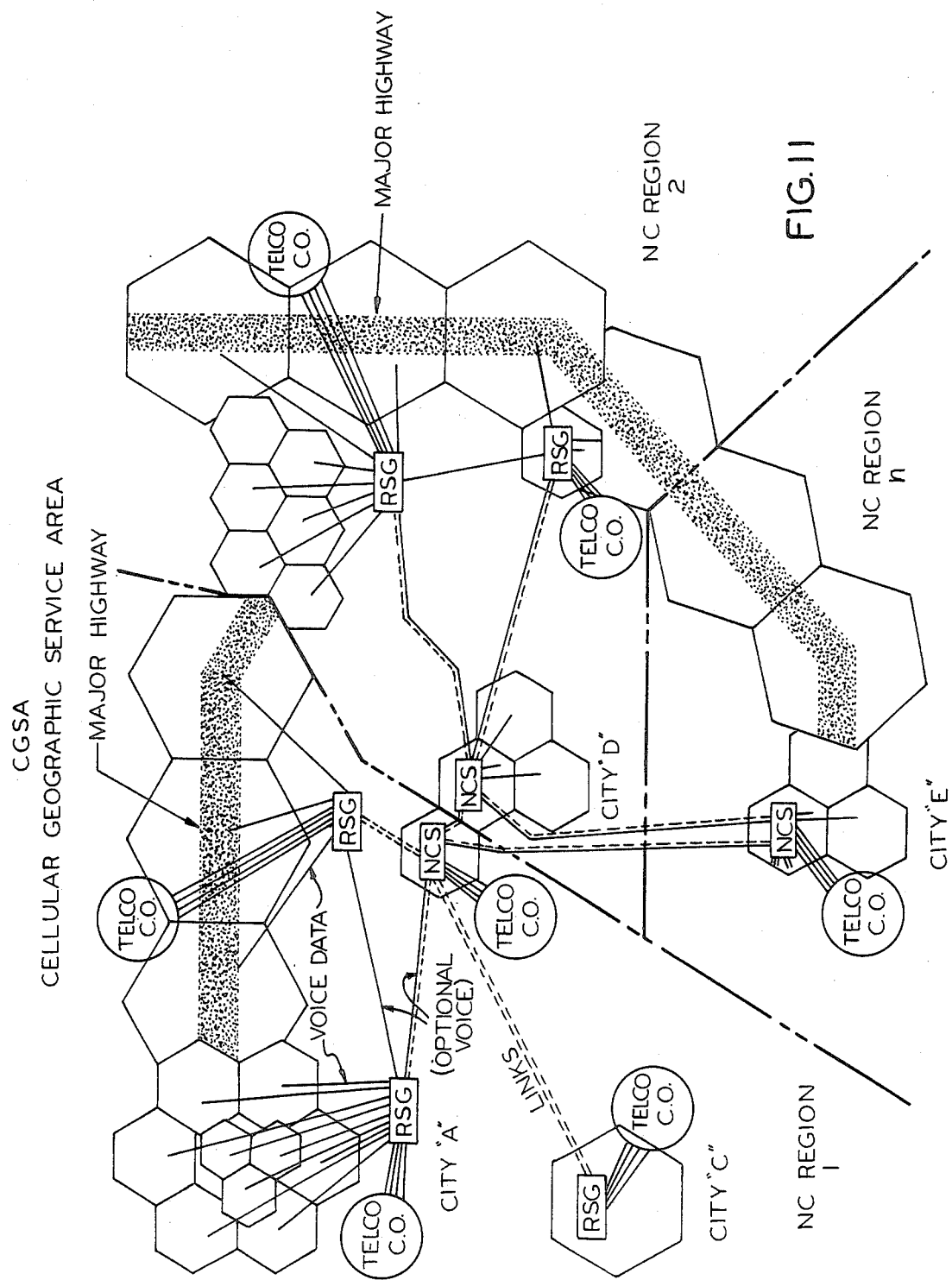
FIG. 11 illustrates a CMRS system utilizing multiple NCS's.
Figure 12:
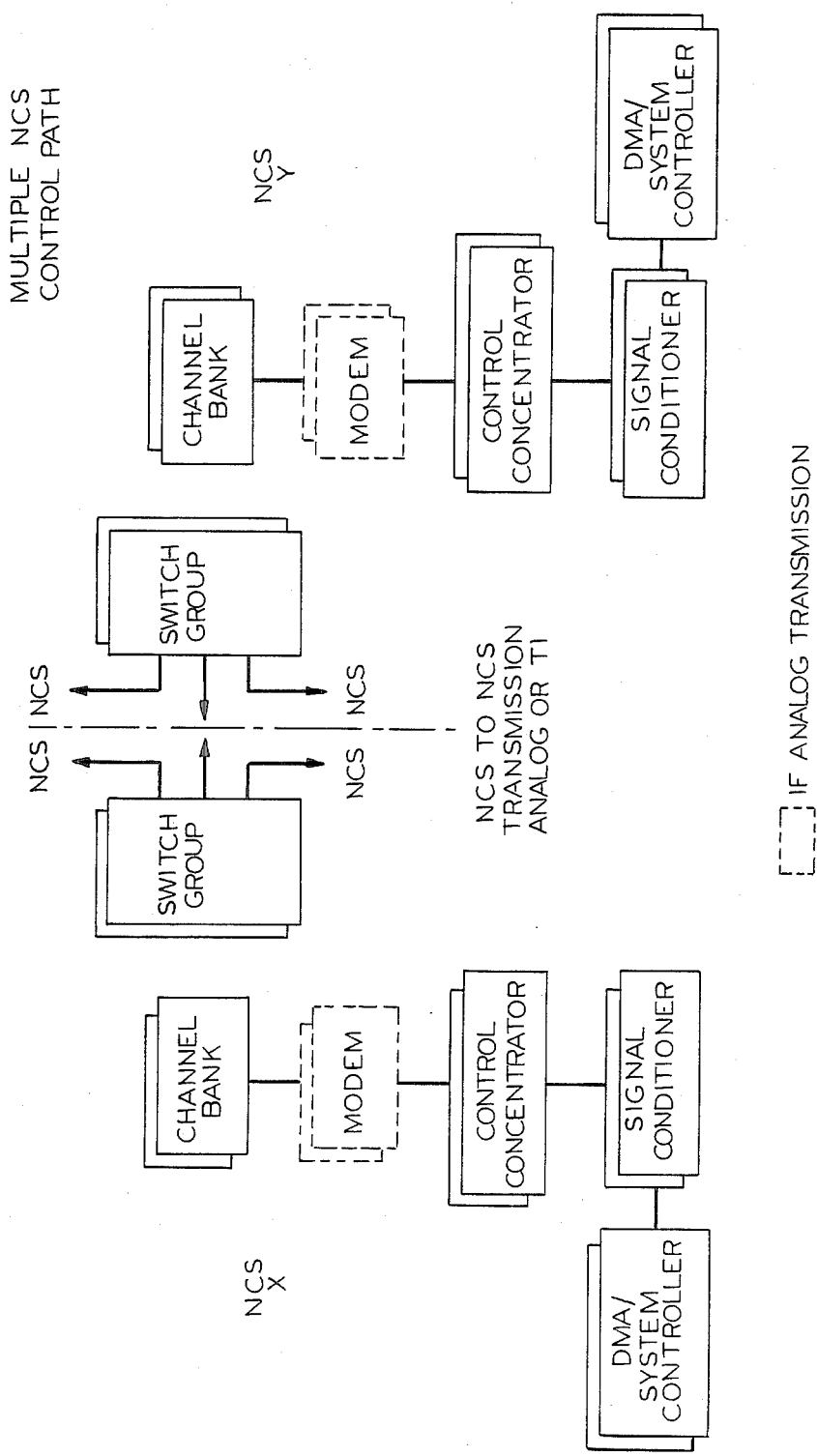
FIG. 12 illustrates a control path arrangement for the system of FIG. 10.

A large cellular geographic area may be served by multiple NCS's each of which is remote from the others as shown in FIG. 11. The switched through control concept may still further advantageously be applied to such an arrangement as shown in FIG. 12 wherein a control path may be established between two NCS's X, Y be establishing a path through the matrix of NCS X, over transmission facility to the other NCS, Y through its matrix and control concentrator.

What is claimed is:

1. A remote switch group, comprising:

a switching matrix; and control means, coupled to said switching matrix, for controlling the switching by said matrix of traffic between a first port of said remote switch group and a second port of said remote switch group, via direction from a network control system located remotely from said group, at least one of said ports being linked to a subtending cell site located closely to said remote switch group relative to said network control system, said control means including microprocessor means enabling voice circuits for calls originating and terminating within a predetermined area served by said remote switch group to be switched directly to a local office or outgoing trunk with no requirement for back-haul voice circuits to said remotely located network control system, said remote switch group duplicating functions performed by said network control systems.

2. A remote switch group according to claim 1, further comprising:

a tone supply, coupled to said switch matrix, for providing tones to mobile units via a cell site port of said remote switch group; and a synchronizable clock, coupled to said switch matrix, for maintaining said switch matrix in synchronism with said network control system.

3. A remote switch group comprising:

a switch group; and control means, coupled to said switch group, for controlling the switching of communication traffic of at least one subtending cell site via direction from a network control system located remotely from said remote switch group, said control means including logic means enabling voice circuits for calls originating and terminating within a predetermined area served by said remote switch group to be switched directly to a local office or outgoing trunk with no requirement for back-haul voice circuits to said remotely located network control system, said remote switch group duplicating functions performed by said network control system.

4. A remote switch group according to claim 3, further comprising:

a tone supply, coupled to said switch group, for providing tones to mobile units via a cell site port of said remote switch group; and a synchronizable clock, coupled to said switch group, for maintaining said switch group in synchronism with said network control system.

5. A remote switch group according to claim 3, further comprising:

a plurality of additional switch groups, coupled to said control means.

* * * * *